Dec. 21, 1965 H. P. PELOSCHEK 3,224,073

METHOD OF MAKING MULTI-TRACK MAGNETIC HEADS

Filed May 2, 1963

INVENTOR.

HANS P. PELOSCHEK

BY

Frank R. Trifari

AGENT

United States Patent Office 3,224,073
Patented Dec. 21, 1965

3,224,073
METHOD OF MAKING MULTI-TRACK MAGNETIC HEADS

Hans Peter Peloschek, Emmasingel, Eindhoven, Netherlands, assignor to North American Philips Company, Inc., New York, N.Y., a corporation of Delaware Filed May 2, 1963, Ser. No. 277,612
Claims priority, application Netherlands, May 9, 1962, 278,248
4 Claims. (Cl. 29—155.5)

This invention relates to a method of manufacturing parts of annular multi-track magnetic heads used for recording, reproducing, or erasing magnetic recordings. It relates more particularly to such magnetic head parts which consist of a plurality of pairs of circuit elements composed of sintered oxidic ferromagnetic material, in which a very short usfeul gap filled with non-magnetic material is located between and bonds together each pair of circuit elements. All the gaps in a multi-track head must be aligned very accurately and alignment corrections cannot be made after the head has been fabricated. Therefore, the manufacture of such heads can be very difficult.

It is a primary object of the invention to provide a method of manufacturing multi-track magnetic heads which can be accurately aligned in a simple manner.

According to one aspect of the invention, there is provided a channel-shaped holder of non-magnetizable material, preferably non-magnetizable ferrite. The holder is provided with abutments which project up from the bottom and are located centrally between the sides, the abutments having the same height as the sides, and grooves are located in the sides each having a width equal to the width of the desired gap. Channel-shaped cores are cemented in the grooves; the upper surfaces of the cores form the confronting surfaces of the gaps and the length of a core is equal to the width of the holder. The grooves have a depth such that after providing the cores the gap-confronting surfaces of the cores and the surface of the holder are substantially co-planar; these surfaces are then polished and the resulting assembly including holder and cores is mechanically divided in half along a plane which passes centrally through all the abutments, after which the two parts thus obtained are placed against each other with the interposition of a non-magnetizable cement between corresponding gap-confronting surfaces, and the parts thus formed, after adhering, are given the desired shape for co-acting with a magnetic record carrier.

According to an embodiment of the method, a high-melting point enamel is preferably used for cementing the cores to the holder and a low-melting point enamel is used for cementing the divided halves together. In the liquid condition enamel has a low viscosity and readily adheres to ferrite.

According to another aspect of the invention, the outer abutments on each side of the holder are formed integrally with the sides, thus providing solid, closed walls for the holder.

The invention also comprises parts of multi-track magnetic heads when manufactured by any one or more of the above methods.

In order that the invention may readily be carried into effect, certain embodiments thereof will now be described more fully, by way of example, with reference to the accompanying drawing, in which.

Figures 1, 2:
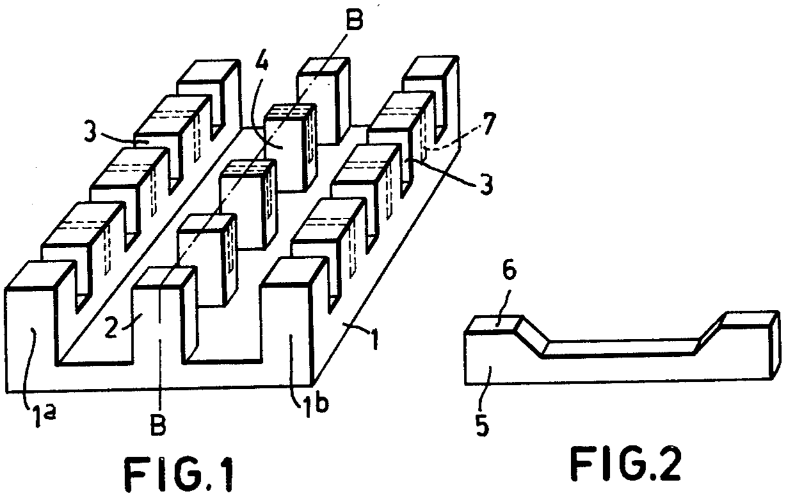
FIGURE 1 is an elevation of a holder for cores of a multi-track magnetic head.
FIGURE 2 is a part of the magnetic circuit.

In FIGURE 1, reference numeral 1 designates a holder which is composed of non-magnetizable ferrite. Tht holder 1 has a channel-shaped cross-section and abutments 2 are provided which project up from the bottom of the holder. Four equally-spaced grooves 3 are provided in each of the sides 1*a* and 1*b*. Each of the three inner abutments 4 is located equidistant between a pair of grooves 3 in one side. Cores 5, such as shown in FIG. 2, are cemented in these grooves 3 by means of a high-melting-point enamel. As can be seen from FIG. 2, cores 5 also have a channel-shaped cross-section; the surfaces 6 of the upper portion of cores 5 form the confronting surfaces of the useful gaps. The grooves 3 have a depth such that, after cementing the cores 5, the surfaces 6 are exactly located in the surface of the sides of the holder 1. After cementing the cores 5, the whole surface of the holder, including the surfaces of the sides 1*a* and 1*b* and the surfaces of the abutments 4 and the surfaces 6, are ground flat and polished. Then the holder is sawed in half along the line B—B and the resulting halves are cemented together at the gap-confronting surfaces 6 by means of a low-melting-point enamel, as a result of which a multi-track magnetic head is obtained in which the gap-confronting surfaces 6 are all accurately in alignment. Finally, coils are provided on the legs of the cores in known manner (not shown) and each pair of core legs is connected by closing members.

Grooves 7 shown in broken lines may be sawed in the holder 1 if it is desired to provide shielding between the various tracks, in which case plates of non-magnetizable metal are provided and cemented in the grooves 7.

Figure 3:
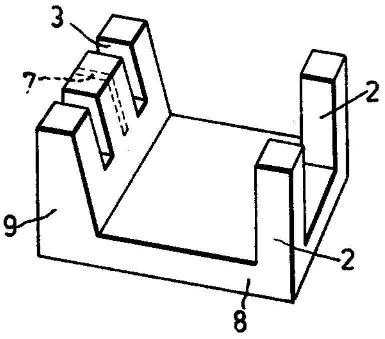
FIGURE 3 shows a part of a similar holder as shown in FIGURE 1 which is sawed across.

FIGURE 3 shows a half 8 of a holder which has been sawed. The side 9 of the holder half 8 is inclined; this provides a larger cementing surfaces for the cores, thus giving greater strength to the assembly after cementing.

Figure 4:
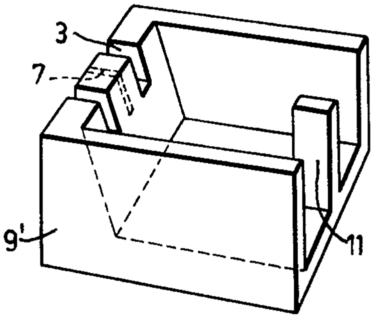
FIGURE 4 shows a part similar to that shown in FIGURE 3, but with closed sides.

FIGURE 4 shows a similar half 9' of a holder as shown in FIGURE 3; however, in FIGURE 4 the part 9 and the abutments 2 are joined, thus forming side walls, while in addition a projection 11 is located between the side walls; after placing the core part 5 in the grooves 3, sawing the holder in half and locally cementing the resulting two parts 9' together, a magnetic head is obtained which is closed by means of the side walls, the gaps being again accurately in alignment.

The material of the cores 5 is preferably sintered oxide ferromagnetic material and that of the holder is preferably non-magnetizable ferrite, although also other heat-resistant non-magnetizable materials may be used. The advantage of ferrite is that no stresses occur during heating, since the coefficients of expansion of both materials are also substantially equal; also, the characteristics of both materials are also substantially equal with respect to machinability.

Since a high-melting-point enamel is used for cementing the cores 5 to the holder and a low-melting-point enamel is used for cementing the two halves of the holder together, the cores will not disengage from the holder when the halves are joined.

While the invention has been described with respect to specific embodiments, variations and modifications thereof will be readily apparent to those skilled in the art without departing from the inventive concept, the scope of which is set forth in the appended claims.

What is claimed is:

1. A method of manufacturing a portion of a multi-track magnetic head, comprising: providing a plurality of spaced-apart grooves in the sides of a channel-shaped holder composed of nonmagnetic ferrite, said holder having a plurality of abutments spaced equally between said sides and projecting from the bottom of the holder in the same direction and having the same height as said sides, each abutment being aligned with a corresponding pair of solid portions of said sides, cementing a channel-shaped core composed of magnetic ferrite in each pair of corresponding grooves, the grooves having a depth such that after a core is placed therein the upper surfaces of the sides of the holder and the upper surfaces of the core are substantially co-planar, polishing all of said surfaces, dividing the resulting assembly into two parts along a plane passing through said abutments transversely through the holder, and bonding said parts together at said surfaces with nonmagnetic bonding material, corresponding portions of said parts being located adjacent each other with the nonmagnetic bonding material being located therebetween, whereby the bonding material located between adjacent core surfaces provides the gap for each head.

2. A method of manufacturing a portion of a multitrack magnetic head, comprising: providing a plurality of spaced-apart grooves in the sides of a channel-shaped holder composed of nonmagnetic ferrite, said holder having a plurality of abutments spaced equally between said sides and projecting from the bottom of the holder in the same direction and having the same height as said sides, each abutment being aligned with a corresponding pair of solid portions of said sides, cementing a channel-shaped core composed of magnetic ferrite in each pair of corresponding grooves with a high melting-point enamel, the grooves having a depth such that after a core is placed therein the upper surfaces of the sides of the holder and the upper surface of the core are substantially co-planar, polishing all of said surfaces, dividing the resulting assembly into two parts along a plane passing through said abutments transversely through the holder, and bonding said parts together at said surfaces with a low melting-point enamel, corresponding portions of said parts being located adjacent each other with the nonmagnetic bonding material being located therebetween, whereby the enamel located between adjacent core surfaces provides a gap for each head.

3. A method of manufacturing a portion of a multitrack magnetic head, comprising: providing a plurality of spaced-apart wide grooves in the sides of a channel-shaped holder composed of nonmagnetic ferrite, said holder having a plurality of abutments spaced equally between said sides and projecting from the bottom of the holder in the same direction and having the same height as said sides, each abutment being aligned with a corresponding pair of solid portions of said sides, providing a plurality of spaced-apart narrow grooves in said solid portions, cementing a channel-shaped core composed of magnetic ferrite in each pair of corresponding wide grooves, the grooves having a depth such that after a core is placed therein the upper surfaces of the sides of the holder and the upper surface of the core are substantially co-planar, placing shielding plates of nonmagnetic metal in each pair of corresponding narrow grooves, dividing the resulting assembly into two parts along a plane passing through said abutments transversely through the holder, and bonding said parts together at said surfaces with nonmagnetic bonding material, corresponding portions of said parts being located adjacent each other with the nonmagnetic bonding material being located therebetween, whereby the bonding material located between adjacent core surfaces provides the gap for each head.

4. A method of manufacturing a portion of a multitrack magnetic head, comprising: providing a plurality of spaced-apart grooves in the sides of a channel-shaped holder composed of nonmagnetic ferrite, said holder having a plurality of abutments spaced equally between said sides and projecting from the bottom of the holder in the same direction and having the same height as said sides, each abutment being aligned with a corresponding pair of solid portions of said sides, said holder having a solid front and back extending between the sides and having the same height as said sides, cementing a channel-shaped core composed of magnetic ferrite in each pair of corresponding grooves, the grooves having a depth such that after a core is placed therein the upper surfaces of the sides of the holder and the upper surface of the core are substantially co-planar, polishing all of said surfaces, dividing the resulting assembly into two parts along a plane passing through said abutments transversely through the holder, and bonding said parts together at said surfaces with nonmagnetic bonding material, corresponding portions of said parts being located adjacent each other with the nonmagnetic bonding material being located therebetween, whereby the bonding material located between adjacent core surfaces provides the gap for each head.

References Cited by the Examiner

UNITED STATES PATENTS

| | | | |
|---|---|---|---|
| 2,728,054 | 12/1955 | Albers-Schoenberg | 336—178 |
| 2,756,280 | 7/1956 | Rettinger | 29—155.5 |
| 2,769,866 | 11/1956 | Kornei | 29—155.5 |
| 3,058,200 | 10/1962 | Duinker et al. | 29—155.61 |
| 3,064,333 | 11/1962 | Krestiansen et al. | 29—155.59 |
| 3,126,615 | 3/1964 | Duinker | 29—155.5 |

WHITMORE A. WILTZ, *Primary Examiner.*

JOHN F. CAMPBELL, *Examiner.*